US012633434B2

(12) United States Patent
Zamami

(10) Patent No.: US 12,633,434 B2
(45) Date of Patent: May 19, 2026

(54) GROMMET AND GROMMET-EQUIPPED WIRE HARNESSES

(71) Applicant: SUMITOMO WIRING SYSTEMS, LTD., Yokkaichi (JP)

(72) Inventor: Kanji Zamami, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 180 days.

(21) Appl. No.: 18/574,359

(22) PCT Filed: Jun. 22, 2022

(86) PCT No.: PCT/JP2022/024931
§ 371 (c)(1),
(2) Date: Dec. 27, 2023

(87) PCT Pub. No.: WO2023/276831
PCT Pub. Date: Jan. 5, 2023

(65) Prior Publication Data
US 2024/0290521 A1 Aug. 29, 2024

(30) Foreign Application Priority Data
Jun. 30, 2021 (JP) ................................. 2021-108558

(51) Int. Cl.
*H01B 17/58* (2006.01)
*H02G 3/04* (2006.01)
(52) U.S. Cl.
CPC ......... *H01B 17/583* (2013.01); *H02G 3/0468* (2013.01)

(58) Field of Classification Search
None
See application file for complete search history.

(56) References Cited

U.S. PATENT DOCUMENTS 1,978,195 A * 10/1934 Haas ....................... F16L 21/06
24/279
5,160,811 A * 11/1992 Ritzmann ............ H02G 3/0691
285/236
(Continued)

FOREIGN PATENT DOCUMENTS

JP       H09-037432 A      2/1997
JP       2011-072085 A     4/2011
(Continued)

OTHER PUBLICATIONS

Aug. 16, 2022 International Search Report issued in International Patent Application No. PCT/JP2022/024931.

*Primary Examiner* — Krystal Robinson
(74) *Attorney, Agent, or Firm* — Oliff PLC

(57) ABSTRACT
A grommet including: a tube into which an electric wire can be inserted, wherein: a corrugated tube covers the electric wire, the tube extends so as to have a length in an axial direction thereof, the tube includes: a fastener provided in a portion of the tube in the axial direction and to which a binding band is fastened from an outer periphery of the fastener with the corrugated tube being inserted thereinto; and protrusions that are provided adjacent to the fastener in the axial direction of the tube, that protrude outward in a radial direction of the tube, and for which a protruding amount is set so that the protrusions protrude more outward than the binding band in the radial direction.

6 Claims, 3 Drawing Sheets

(56)  References Cited

U.S. PATENT DOCUMENTS

| | | | | |
|---|---|---|---|---|
| 5,297,586 | A * | 3/1994 | McIntosh | F16L 33/207 |
| | | | | 138/121 |
| 6,444,912 | B1 * | 9/2002 | Grossman | B60R 16/0215 |
| | | | | 174/99 R |
| 7,723,622 | B2 * | 5/2010 | Dukes | H02G 3/22 |
| | | | | 16/2.2 |
| 8,091,949 | B2 * | 1/2012 | Toyozumi | B60R 16/0215 |
| | | | | 174/152 G |
| 8,791,367 | B2 * | 7/2014 | Hartman | H05K 7/1491 |
| | | | | 174/152 G |
| 11,433,831 | B2 * | 9/2022 | Nishi | H02G 3/263 |
| 2013/0118777 | A1 * | 5/2013 | Yamaguchi | B60R 16/0215 |
| | | | | 174/135 |
| 2014/0069691 | A1 * | 3/2014 | Cox | F02C 7/00 |
| | | | | 174/135 |
| 2015/0107894 | A1 * | 4/2015 | Hayashi | H01B 7/0045 |
| | | | | 174/72 A |
| 2016/0126709 | A1 * | 5/2016 | Maeda | B60R 16/0215 |
| | | | | 174/68.3 |
| 2016/0180989 | A1 * | 6/2016 | Nakai | H02G 3/0468 |
| | | | | 174/152 G |
| 2018/0223457 | A1 * | 8/2018 | Kaing | D03D 15/283 |
| 2021/0122307 | A1 * | 4/2021 | Onodera | H02G 3/0468 |
| 2022/0410825 | A1 * | 12/2022 | Niwa | B60L 15/32 |

FOREIGN PATENT DOCUMENTS

| | | | |
|---|---|---|---|
| JP | 2012-235575 | A | 11/2012 |
| JP | 2018-182890 | A | 11/2018 |

* cited by examiner

GROMMET AND GROMMET-EQUIPPED WIRE HARNESSES

BACKGROUND

The present disclosure relates to a grommet and a grommet-equipped wire harness.

An example of a conventional wire harness is a grommet-equipped wire harness that prevents an electric wire from being exposed to water (for example, see WO 2016/153045). A grommet-equipped wire harness includes, for example, an electric wire member including an electric wire and an exterior member that covers the electric wire, such as a corrugated tube, and a grommet that is made of rubber or the like and includes a tubular portion. The tubular portion includes a fastening portion that is provided in a portion of the tubular portion in the lengthwise direction thereof and to which a binding band is fastened from the outer periphery of the fastening portion. An end portion of the exterior member such as the corrugated tube is inserted into the tubular portion of the grommet, and is fixed to the tubular portion by fastening the binding band from the outer periphery of the fastening portion.

SUMMARY

However, in the grommet-equipped wire harness as described above, the fastening portion is a groove whose outer diameter is slightly smaller than the other portions of the tubular portion, and therefore, for example, the binding band is likely to be displaced from the fastening portion in the lengthwise direction of the tubular portion. In addition, since the fastening portion is a groove whose outer diameter is slightly smaller than the other portions of the tubular portion, it is difficult for an operator or the like to visually recognize the fastening portion, for example. Therefore, workability is poor when the binding band is fastened, and even if the binding band is displaced from the fastening portion in the lengthwise direction of the tubular portion, it is difficult for an operator or the like to notice such displacement. For these reasons, there is a problem in that the reliability of the fixed state of the electric wire member and the grommet is poor.

An exemplary aspect of the disclosure provides a grommet and a grommet-equipped wire harness that can improve the reliability of the fixed state of the electric wire member and the grommet.

A grommet according to the present disclosure includes a tube into which an electric wire can be inserted. The tube includes: a fastener provided in a portion of the tube in a lengthwise direction thereof and to which a binding band is fastened from an outer periphery of the fastener; and protrusions that are provided adjacent to the fastener in the lengthwise direction of the tube, that protrude outward in a radial direction of the tube, and for which a protruding amount is set so that the protrusions protrude more outward than the binding band in the radial direction.

A grommet-equipped wire harness according to the present disclosure includes: the grommet; the electric wire member; and the binding band.

With the grommet and the grommet-equipped wire harness according to the present disclosure, it is possible to improve the reliability of the fixed state of the electric wire member and the grommet.

DETAILED DESCRIPTION OF EMBODIMENTS

Description of Embodiments of Present Disclosure

Figure 1:
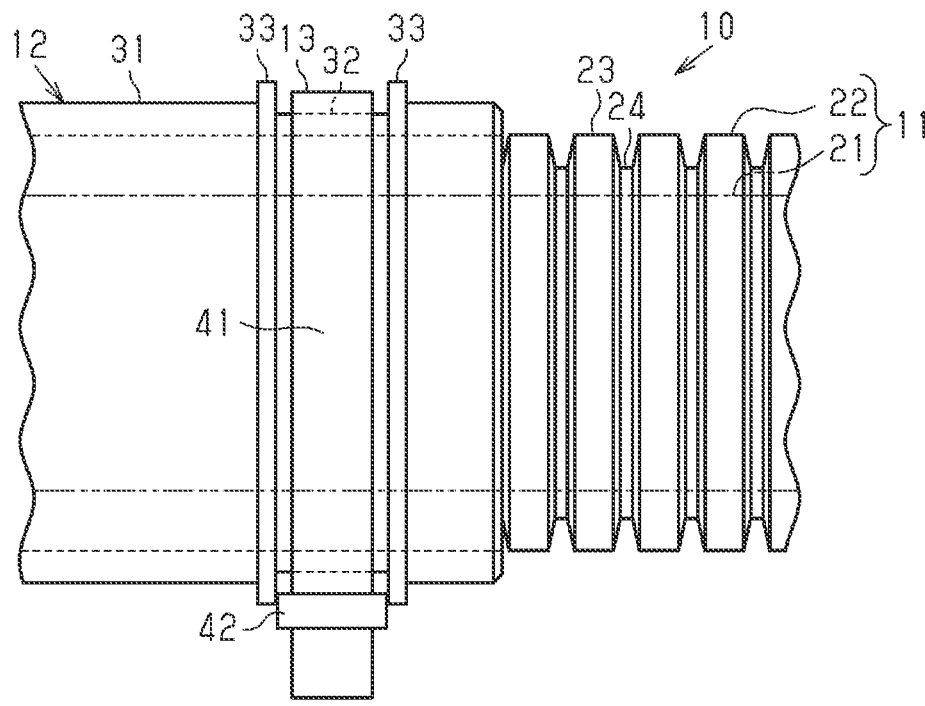
FIG. 1 is a partial side view of a grommet-equipped wire harness according to an embodiment.

First, embodiments of the present disclosure will be listed and described.

A grommet according to the present disclosure

[1] includes a tubular portion into which an electric wire member can be inserted. The tubular portion includes: a fastening portion provided in a portion of the tubular portion in a lengthwise direction thereof and to which a binding band is fastened from an outer periphery of the fastening portion; and protruding portions that are provided adjacent to the fastening portion in the lengthwise direction of the tubular portion, that protrude outward in a radial direction of the tubular portion, and for which a protruding amount is set so that the protruding portions protrude more outward than the binding band in the radial direction.

With this configuration, the protruding portions included in the tubular portion improve the reliability of the fixed state of the electric wire member and the grommet. Specifically, the protruding portions are provided adjacent to the fastening portion in the lengthwise direction of the tubular portion and protrude outward from the tubular portion in the radial direction, and the amount of protrusion is set so that the protruding portions protrude more outward than the binding band in the radial direction. Therefore, for example, the binding band is less likely to be displaced from the fastening portion in the lengthwise direction of the tubular portion. In addition, for example, an operator or the like can more easily visually recognize the protruding portions and the fastening portion. Therefore, workability is improved when the binding band is fastened, and an operator or the like can more easily notice that the binding band is displaced from the fastening portion in the lengthwise direction of the tubular portion. For these reasons, the binding band can be stably and properly attached, the attached state of the binding band can be stable, and the reliability of the fixed state of the electric wire member and the grommet can be improved.

[2] It is preferable that the protruding portions are provided on both sides of the fastening portion in the lengthwise direction of the tubular portion.

With this configuration, the protruding portions are provided on both sides of the fastening portion in the lengthwise direction of the tubular portion. Therefore, for example, the binding band is less likely to be displaced from the fastening portion in both directions in the lengthwise direction of the tubular portion.

[3] It is preferable that the fastening portion has a smaller outer diameter than other portions of the tubular portion in the lengthwise direction thereof.

With this configuration, the fastening portion has a smaller outer diameter than the other portions of the tubular portion in the lengthwise direction thereof. Therefore, for example, the fastening portion may be configured to have a thin wall and to be easily elastically deformed so that the fastening portion can be more easily brought into close contact with the electric wire member in the state where the binding band is fastened. Furthermore, for example, it is possible to reduce the maximum outer diameter of the tubular portion including the protruding portions.

[4] It is preferable that the protruding portions are provided along an entire circumference of the tubular portion in an annular shape.

With this configuration, the protruding portions are provided along the entire circumference of the tubular portion in an annular shape, and therefore the binding band is less likely to be displaced from the fastening portion in the lengthwise direction of the tubular portion with respect to the entire circumference of the fastening portion. In addition, for example, an operator or the like can more easily visually recognize the protruding portions and the fastening portion with respect to the entire circumference of the fastening portion.

[5] It is preferable that the protruding portions are provided along a portion of the tubular portion in a circumferential direction thereof.

With this configuration, the protruding portions are provided along a portion of the tubular portion in the circumferential direction. Therefore, for example, it is possible to avoid component interference between other members such as the lock portion provided on the binding band and the protruding portions.

[6] It is preferable that wall surfaces that extend in a radial direction of the tubular portion to connect top surfaces of the protruding portions and the fastening portion are inclined with respect to the radial direction of the tubular portion in such a direction that the wall surfaces are visible when viewed from a radially outer side of the tubular portion.

With this configuration, the wall surfaces extending in the radial direction of the tubular portion to connect the top surfaces of the protruding portions and the fastening portion are inclined with respect to the radial direction of the tubular portion in such a direction that the wall surfaces are visible when viewed from the radially outer side of the tubular portion. Therefore, for example, workability is improved when the binding band is fastened. Specifically, when the binding band is to be fastened to the fastening portion, even if the positioning accuracy thereof with respect to each other is poor, the binding band is guided by the wall surfaces toward the fastening portion while the binding band is fastened. Therefore, workability is improved when fastening the binding band.

A grommet-equipped wire harness according to the present disclosure

[1] includes: the grommet; the electric wire member; and the binding band.

With this configuration, in the grommet-equipped wire harness, the reliability of the fixed state of the electric wire member and the grommet is improved.

Details of Embodiments of Present Disclosure

Hereinafter, specific examples of a grommet-equipped wire harness according to the present disclosure will be described with reference to the drawings. In each drawing, for convenience of explanation, some parts of the configuration may be exaggerated or simplified. In addition, the dimensional ratio of each part may differ in each drawing. Note that the present disclosure is not limited to the examples, but is indicated by the scope of claims, and is intended to include all changes within the meaning and scope of equivalence to the scope of claims. The terms "parallel" and "orthogonal" in the present specification are not limited to being strictly parallel or orthogonal, but may be substantially parallel or orthogonal within the range in which the actions and effects of the embodiments can be exhibited. In addition, the terms "circle" and "arc" in the present specification are not limited to being strictly a circle or an arc, but may be substantially a circle or an arc within the range in which the actions and effects of the embodiments can be exhibited.

Overall Configuration of Grommet-Equipped Wire Harness 10

Figure 2:
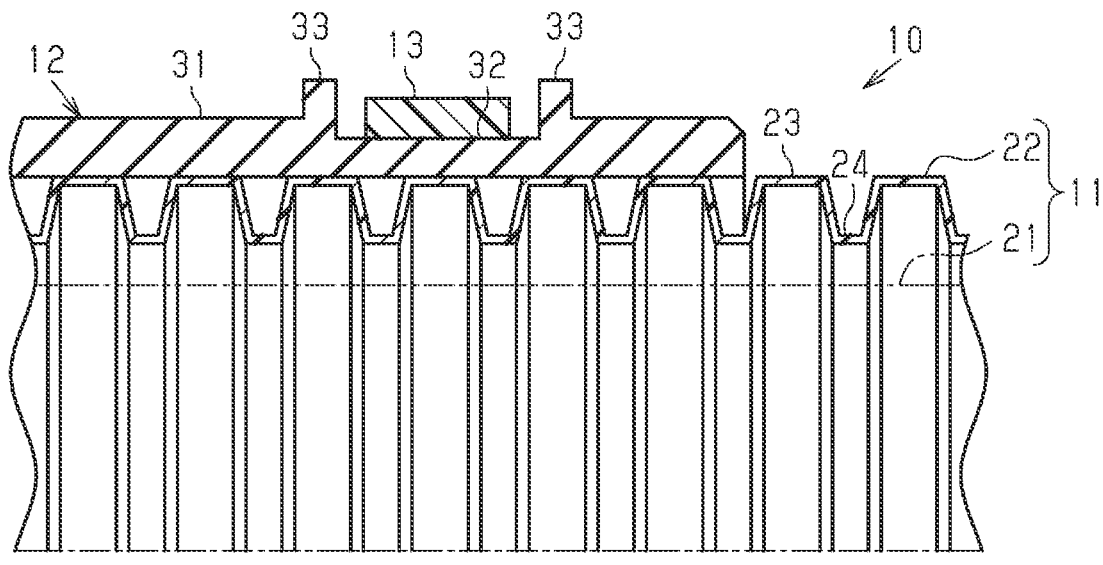
FIG. 2 is a partial cross-sectional view of the grommet-equipped wire harness according to the embodiment.

As shown in FIGS. 1 and 2, the grommet-equipped wire harness 10 includes an electric wire member 11, a grommet 12, and a binding band 13.

Configuration of Electric Wire Member 11

The electric wire member 11 includes an electric wire 21 and a corrugated tube 22 that serves as an exterior member covering the electric wire 21. The corrugated tube 22 is formed into a tubular shape and has a bellows structure in which large-diameter portions 23 having a large diameter and small-diameter portions 24 having a small diameter are alternately arranged in the lengthwise direction of the corrugated tube 22.

Configuration of Grommet 12

The grommet 12 includes a tubular portion 31 (tube) into which the electric wire member 11 can be inserted. The tubular portion 31 includes a fastening portion 32 (fastener) and protruding portions 33 (protrusions).

The fastening portion 32 is provided in a portion of the tubular portion 31 in the lengthwise direction thereof. The fastening portion 32 has a smaller outer diameter than the other portions of the tubular portion 31 in the lengthwise direction thereof. Therefore, the fastening portion 32 constitutes a groove recessed in the outer peripheral surface of the tubular portion 31. A binding band 13 is fastened from the outer periphery of the fastening portion 32 with the end portion or the like of the corrugated tube 22 inserted into the tubular portion 31. Note that the binding band 13 includes a flexible band-shaped portion 41 and a lock portion 42 provided at an end portion of the band-shaped portion 41 in the lengthwise direction thereof. When the band-shaped portion 41 is passed through the lock portion 42, the lock portion 42 restricts the band-shaped portion 41 from moving in the pulling direction, which is the opposite direction to the passing direction, to lock the band-shaped portion 41.

The protruding portions 33 are provided adjacent to the fastening portion 32 in the lengthwise direction of the tubular portion 31. The protruding portions 33 are provided on both sides of the fastening portion 32 in the lengthwise direction of the tubular portion 31. The protruding portions 33 protrudes outward in the radial direction of the tubular portion 31. The protruding amount of the protruding portions 33 is set so that the protruding portions 33 protrude more outward than the binding band 13 fastened to the fastening portion 32 in the radial direction. The protruding portions 33 are provided along the entire circumference of the tubular portion 31 in an annular shape.

The operation of the present embodiment will be described.

In the grommet-equipped wire harness 10, the electric wire 21 is covered by the corrugated tube 22 and thus prevented from being exposed to water. In addition, an end portion of the corrugated tube 22 is inserted into the tubular portion 31 of the grommet 12, and the binding band 13 is fastened to the fastening portion 32 so that the end portion of the corrugated tube 22 is kept in the state of being covered by the grommet 12. Thus, the electric wire 21 exposed from the end portion of the corrugated tube 22 is prevented from being exposed to water.

Next, effects of the above-described embodiment will be described below.

(1) The protruding portions 33 included in the tubular portion 31 improve the reliability of the fixed state of the electric wire member 11 and the grommet 12. Specifically, the protruding portions 33 are provided adjacent to the fastening portion 32 in the lengthwise direction of the tubular portion 31 and protrude outward in the radial direction of the tubular portion 31, and the protruding amount is set so that the protruding portions 33 protrude more outward than the binding band 13 in the radial direction. Therefore, for example, the binding band 13 is less likely to be displaced from the fastening portion 32 in the lengthwise direction of the tubular portion 31. In addition, for example, an operator or the like can more easily visually recognize the protruding portions 33 and the fastening portion 32. Therefore, workability is improved when the binding band 13 is fastened, and an operator or the like can more easily notice that the binding band 13 is displaced from the fastening portion 32 in the lengthwise direction of the tubular portion 31. For these reasons, the binding band 13 can be stably and properly attached, the attached state of the binding band 13 can be stable, and the reliability of the fixed state of the electric wire member 11 and the grommet 12 can be improved.

(2) The protruding portions 33 are provided on both sides of the fastening portion 32 in the lengthwise direction of the tubular portion 31. Therefore, for example, the binding band 13 is less likely to be displaced from the fastening portion 32 in both directions in the lengthwise direction of the tubular portion 31.

(3) The fastening portion 32 has a smaller outer diameter than the other portions of the tubular portion 31 in the lengthwise direction thereof. Therefore, for example, the fastening portion 32 may be configured to have a thin wall and to be easily elastically deformed so that the fastening portion 32 can be more easily brought into close contact with the electric wire member 11 in the state where the binding band 13 is fastened. Furthermore, for example, it is possible to reduce the maximum outer diameter of the tubular portion 31 including the protruding portions 33.

(4) The protruding portions 33 are provided along the entire circumference of the tubular portion 31 in an annular shape, and therefore the binding band 13 is less likely to be displaced from the fastening portion 32 in the lengthwise direction of the tubular portion 31 with respect to the entire circumference of the fastening portion 32. In addition, for example, an operator or the like can more easily visually recognize the protruding portions 33 and the fastening portion 32 with respect to the entire circumference of the fastening portion 32.

Modifications

The present embodiment can be implemented with the following modifications. The present embodiment and the following modifications may be implemented in combination with each other as long as no technical inconsistencies arise.

The wall surfaces extending in a radial direction of the tubular portion 31 to connect the top surfaces of the protruding portions 33 and the fastening portion 32 in the above-described embodiment may be inclined with respect to the radial direction of the tubular portion 31.

Figure 3:
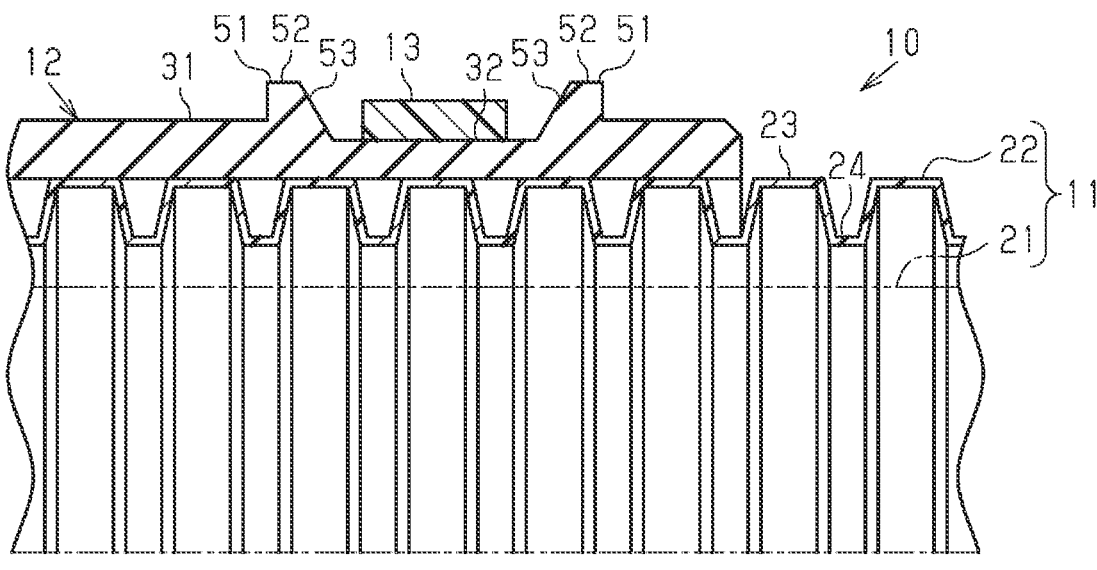
FIG. 3 is a partial cross-sectional view of a grommet-equipped wire harness according to another example.

For example, as shown in FIG. 3, wall surfaces 53 that extend in a radial direction of the tubular portion 31 to connect top surfaces 52 of protruding portions 51 and the fastening portion 32 may be configured to be inclined with respect to the radial direction of the tubular portion 31 in such a direction that the wall surfaces 53 are visible when viewed from the radially outer side of the tubular portion 31. That is to say, the pair of wall surfaces 53 in this example are inclined in such a direction that the wall surfaces 53 gradually approach each other in a direction toward the radially inner side of the cylindrical portion 31. In addition, each wall surface 53 in this example is inclined so that the cross section thereof taken along a radial direction of the tubular portion 31 is linear.

Figure 4:
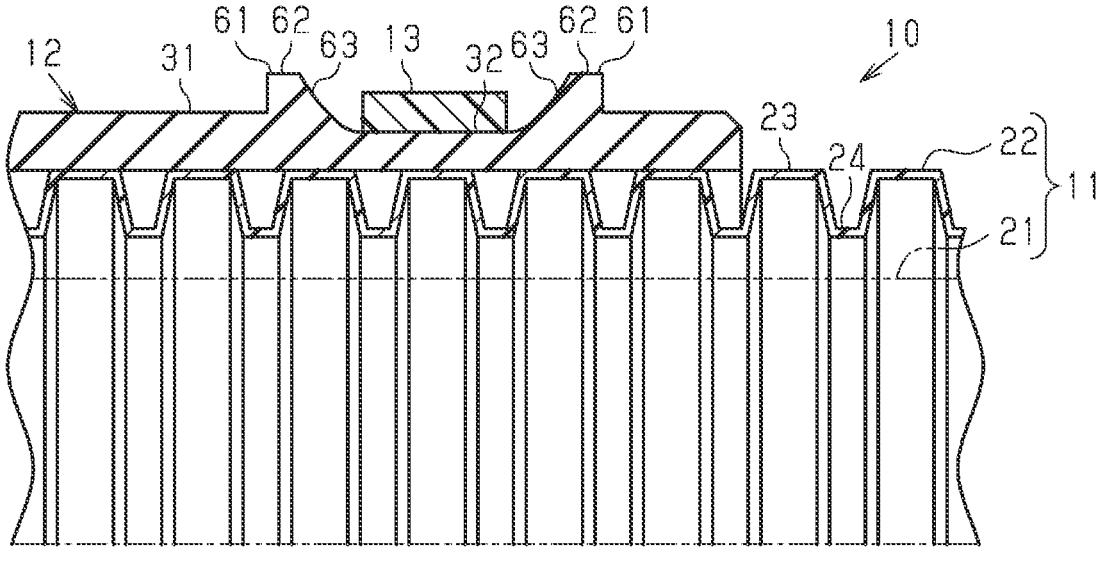
FIG. 4 is a partial cross-sectional view of a grommet-equipped wire harness according to another example.

Furthermore, for example, as shown in FIG. 4, wall surfaces 63 that extend in a radial direction of the tubular portion 31 to connect top surfaces 62 of protruding portions 61 and the fastening portion 32 may be configured to be inclined with respect to the radial direction of the tubular portion 31 so that the wall surfaces 63 are visible when viewed from the radially outer side of the tubular portion 31. That is to say, the pair of wall surfaces 63 in this example are inclined in such a direction that the wall surfaces 63 gradually approach each other in a direction toward the radially inner side of the cylindrical portion 31. In addition, each wall surface 63 in this example is inclined so that the cross section thereof taken along a radial direction of the tubular portion 31 has a curved shape.

With these configurations, for example, workability is improved when fastening the binding band 13. Specifically, when the binding band 13 is to be fastened to the fastening portion 32, even if the positioning accuracy thereof with respect to each other is poor, the binding band 13 is guided by the wall surfaces 53 or 63 toward the fastening portion 32 while the binding band is fastened. Therefore, workability is improved when fastening the binding band 13.

Figure 5:
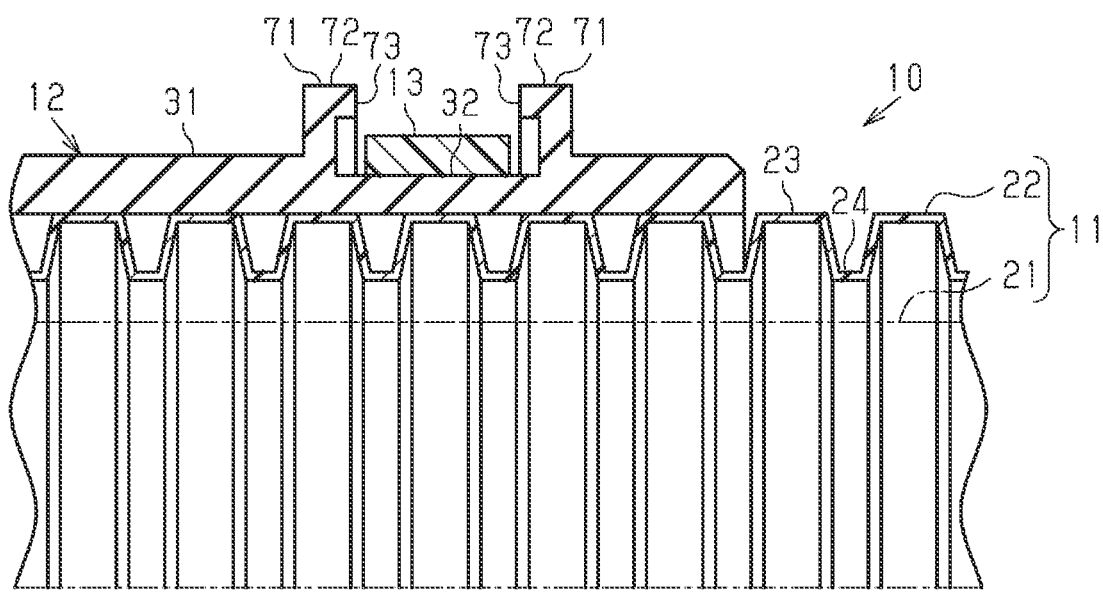
FIG. 5 is a partial cross-sectional view of a grommet-equipped wire harness according to another example.

As shown in FIG. 5, each protruding portion 71 may include an extension portion 73 that extends from a top surface 72 of the protrusion portion 71 in such a direction that the extension portion 73 covers the outer periphery side of the fastening portion 32.

With such a configuration, for example, the binding band 13 is less likely to be displaced from the fastening portion 32 in the lengthwise direction of the tubular portion 31.

Although each protruding portion 33 in the above embodiment is provided along the entire circumference of the tubular portion 31 in an annular shape, each protruding portion 33 is not limited to having such a configuration, and may be provided along a portion of the tubular portion 31 in the circumferential direction.

Figure 6:
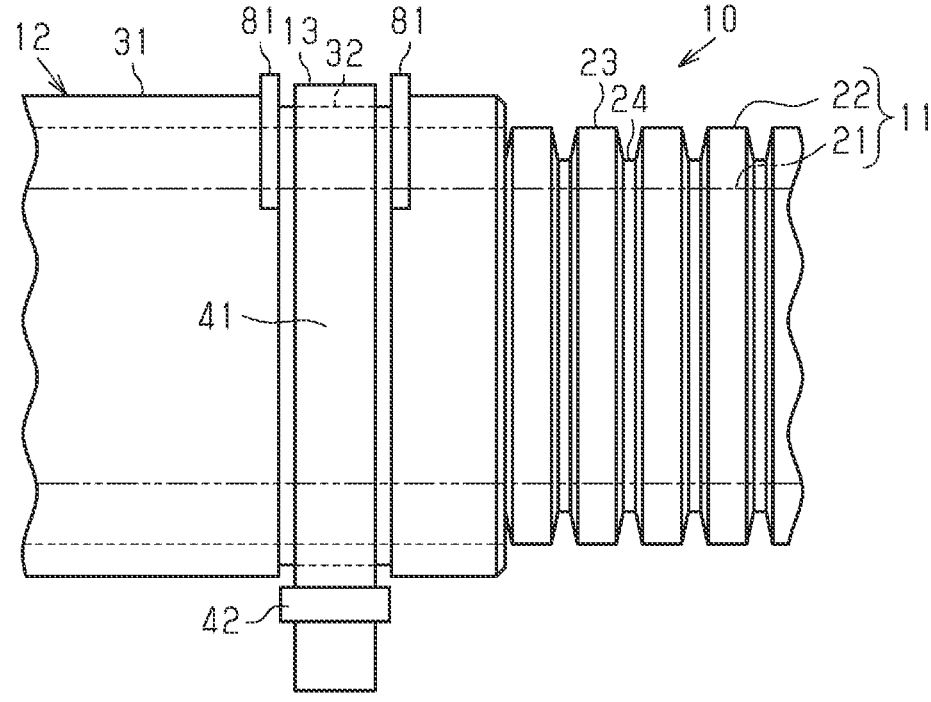
FIG. 6 is a partial cross-sectional view of a grommet-equipped wire harness according to another example.

For example, as shown in FIG. 6, each protruding portion 81 may be a portion of the tubular portion 31 in a circumferential direction and provided at one position. Alternatively, protruding portions may be provided at a plurality of positions in the circumferential direction of the tubular portion 31.

With such a configuration, for example, it is possible to avoid component interference between the protruding portions 81 and other members such as the lock portion 42 provided on the binding band 13. That is to say, in the above-described embodiment, the protruding portions 33 and the lock portion 42 may cause component interference. In contrast, in the configuration in which one or more protruding portions 81 are provided on one or more portions of the tubular portion 31 in the circumferential direction thereof, the protruding portions 81 and the lock portion 42 can be shifted from each other so that component interference can be avoided.

In the above-described embodiment, the protruding portions 33 are provided on both sides of the fastening portion 32 in the lengthwise direction of the tubular portion 31. However, the protruding portions 33 are not limited to such a configuration, and may be provided on only one side of the fastening portion 32 in the lengthwise direction of the tubular portion 31, for example.

In the above-described embodiment, the fastening portion 32 has a smaller outer diameter than the other portions of the tubular portion 31 in the lengthwise direction thereof. However, the fastening portion 32 is not limited to such a configuration. For example, the fastening portion 32 may have the same outer diameter as the other portions of the tubular portion 31 where the protruding portions 33 are not provided In the above-described embodiment, the electric wire member 11 includes the electric wire 21 and the corrugated tube 22 that serves as an exterior member. However, the electric wire member 11 is not limited to such a configuration. For example, the exterior member may be a tubular member other than the corrugated tube 22. Furthermore, as a matter of course, the electric wire member 11 may include a plurality of electric wires 21, and the plurality of electric wires 21 may be covered by the corrugated tube 22.

In one example, the tubular portion 31 may be in direct contact with or capable of being in direct contact with the radially outermost surface of the large-diameter portion 23 of the corrugated tube 22 along the entire length of the tubular portion 31. In one example, the tubular portion 31 of the grommet 12 may have a flat inner circumferential surface that is not provided with a radially inward protrusion that engages with the small-diameter portion 24 of the corrugated tube 22. The inner diameter of the tubular portion 31 of the grommet 12 may be constant along the entire length of the tubular portion 31.

In one example, the tubular portion 31 of the grommet 12 may extend so as to have a length in an axial direction thereof from an opening end of the grommet 12. In some non-limiting examples, the grommet 12 may include the fastening portion 32 at a first position in the axial direction of the grommet 12, which is different from the opening end of the grommet 12, and may include a non-fastening portion at a leading end length portion extending from the opening end to the first position in the axial direction of the grommet 12. The non-fastening portion, i.e., the leading end length portion, may include a second position in the axial direction, which is adjacent to the first position in the axial direction of the grommet 12. One of the two protruding portions 33 of the grommet 12 may be formed at the second position in the axial direction. In some non-limiting examples, both the inner circumferential surface of the fastening portion 32 and the inner circumferential surface of the non-fastening portion of the grommet 12 may be in direct contact with or capable of being in direct contact with the radially outermost surface of the large-diameter portion 23 of the corrugated tube 22.

When the fastening portion 32 of the grommet 12 is not fastened, i.e., when the fastening portion 32 is in an undeformed state or a natural state, the tubular portion 31 of the grommet 12 including the fastening portion 32 may allow the corrugated tube 22 to move in the axial direction. When the fastening portion 32 of the grommet 12 is fastened, the fastening portion 32 of the grommet 12 may be locally reduced in diameter and come into frictional contact with the corrugated tube 22 so that movement of the corrugated tube 22 in an axial direction can be prevented or reduced. When the fastening portion 32 is fastened, the non-fastening portion need not be reduced substantially in diameter.

The shortest distance from the outer circumferential surface of the protruding portion 33 to the inner circumferential surface of the tubular portion 31 in a cross-sectional view may be longer than the shortest distance from the outer circumferential surface of the binding band 13 to the inner circumferential surface of the tubular portion 31 in a cross-sectional view in a state where the fastening portion 32 is fastened.

A technical idea that can be understood from the above will be described.

(i) A grommet according to any one of claims 1 to 6, wherein the protruding portion includes an extension portion that extends from a top surface of the protruding portion in such a direction that the extension portion covers an outer periphery side of the fastening portion.

With this configuration, the protruding portion includes an extension portion that extends from a top surface of the protruding portion in such a direction that the extension portion covers the outer periphery side of the fastening portion. Therefore, for example, the binding band is less likely to be displaced from the fastening portion in the lengthwise direction of the tubular portion.

The invention claimed is:

1. A grommet comprising:
   a tube into which an electric wire can be inserted, wherein:
   a corrugated tube covers the electric wire,
   the tube extends so as to have a length in an axial direction thereof,
   the tube includes:
      a fastener provided in a portion of the tube in the axial direction and to which a binding band is fastened from an outer periphery of the fastener with the corrugated tube being inserted thereinto; and
      protrusions that are provided adjacent to the fastener in the axial direction of the tube, that protrude outward in a radial direction of the tube, and for which a protruding amount is set so that the protrusions protrude more outward than the binding band in the radial direction, and
   the tube has an inner diameter that is constant along an entire length of the tube, and the fastener has a smaller outer diameter smaller than other portions of the tube in the axial direction.

2. The grommet according to claim 1,
   wherein the protrusions are provided on both sides of the fastener in the axial direction of the tube.

3. The grommet according to claim 1,
   wherein the protrusions are provided along an entire circumference of the tube in an annular shape.

4. The grommet according to claim 1,
   wherein the protrusions are provided along a portion of the tube in a circumferential direction thereof.

5. The grommet according to claim 1,
   wherein wall surfaces that extend in a radial direction of the tube to connect top surfaces of the protrusions and the fastener are inclined with respect to the radial direction of the tube in such a direction that the wall surfaces are visible when viewed from a radially outer side of the tube.

6. A grommet-equipped wire harness comprising:

the grommet according to claim 1;

the electric wire; and the binding band.

* * * * *